United States Patent [19]

Bartholomew et al.

[11] Patent Number: 5,712,903
[45] Date of Patent: Jan. 27, 1998

[54] SPLIT INTELLIGENT PERIPHERAL FOR BROADBAND AND NARROWBAND SERVICES

[75] Inventors: Dale Bartholomew, Vienna, Va.; Bing N. Der, Silver Spring, Md.; Robert D. Farris, Sterling, Va.; Christine D. McDermott, Reston, Va.; Colleen Harp, Annandale, Va.; Richard G. Backus, Manassas, Va.

[73] Assignee: Bell Atlantic Network Services, Inc., Arlington, Va.

[21] Appl. No.: 518,471

[22] Filed: Aug. 21, 1995

[51] Int. Cl.$^6$ .................... H04M 7/00; H04L 12/56
[52] U.S. Cl. .................... 379/89; 379/201; 379/207; 379/229; 379/230; 370/354; 348/7
[58] Field of Search .................... 379/230, 9, 10, 379/11, 221, 207, 94; 370/92, 62, 60.1, 94.2, 110.1, 60, 94.1, 93, 354, 271, 260, 265, 264, 463; 348/6, 7

[56] References Cited

U.S. PATENT DOCUMENTS

| | | | |
|---|---|---|---|
| 4,313,036 | 1/1982 | Jabara | 379/230 |
| 4,441,180 | 4/1984 | Schüssler | 370/3 |
| 4,654,866 | 3/1987 | Böttle et al. | 379/54 |
| 4,769,833 | 9/1988 | Farleigh et al. | 379/105 |
| 4,782,482 | 11/1988 | Kiatipov | 370/86 |
| 4,827,500 | 5/1989 | Binkerd et al. | 379/88 |
| 4,837,798 | 6/1989 | Cohen et al. | 379/88 |
| 4,965,790 | 10/1990 | Nishino et al. | 370/85.12 |
| 4,970,721 | 11/1990 | Aczel et al. | 370/92 |
| 5,029,200 | 7/1991 | Haas et al. | 379/89 |
| 5,133,004 | 7/1992 | Heileman, Jr. et al. | 379/67 |
| 5,187,735 | 2/1993 | Herrero Garcia et al. | 379/88 |
| 5,193,110 | 3/1993 | Jones et al. | 379/94 |
| 5,206,901 | 4/1993 | Harlow et al. | 379/211 |
| 5,208,848 | 5/1993 | Pula | 379/67 |
| 5,297,146 | 3/1994 | Ogawa | 370/62 |
| 5,305,312 | 4/1994 | Fornek et al. | 370/62 |
| 5,329,308 | 7/1994 | Binns et al. | 348/14 |
| 5,329,572 | 7/1994 | Martens | 348/16 |
| 5,343,240 | 8/1994 | Yu | 348/14 |
| 5,384,829 | 1/1995 | Heileman, Jr. et al. | 379/67 |
| 5,400,068 | 3/1995 | Ishida et al. | 348/14 |
| 5,428,608 | 6/1995 | Freeman et al. | 370/62 |
| 5,574,779 | 11/1996 | Ely et al. | 379/207 |
| 5,583,927 | 12/1996 | Ely et al. | 379/207 |

OTHER PUBLICATIONS

Roger K. Berman et al, "Perspectives on the AIN Architecture", IEEE Communications Magazine, Feb. 1992, pp. 27–32.

Frank J. Weisser et al, "The Intelligent Network and Forward–Looking Technology", IEEE Communications Magazine, Dec. 1988, pp. 64–69.

J. Shah et al, "Application of a New Network Concept for Faster Service Deployment", International Conference on Communications '88, Jun. 12–15, 1988, IEEE Communications Society, Conference Record, vol. 3, pp. 1327–1329.

Primary Examiner—Krista M. Zele
Assistant Examiner—Daniel S. Hunter
Attorney, Agent, or Firm—Lowe, Price, LeBlanc & Becker

[57] ABSTRACT

An Intelligent Peripheral (IP) is used in combination with both narrowband type services (e.g., voice mail) and broadband type services (e.g., video transmission) and may provide protocol conversion, message translation, speech recognition, message editing and/or message-to-text conversion. The IP has a gateway switch between the various internal processing modules and the network line or trunk connections. The gateway switch provides selective routing of incoming calls to the appropriate modules, some modules providing narrowband type services and other modules providing broadband processing.

38 Claims, 12 Drawing Sheets

SPLIT INTELLIGENT PERIPHERAL FOR BROADBAND AND NARROWBAND SERVICES

TECHNICAL FIELD

The present invention relates to an Intelligent Peripheral (IP) used in an Advanced Intelligent Network having a switching system and a programmable central database.

ACRONYMS

The written description uses a large number of acronyms to refer to various services and system components. Although generally known, use of several of these acronyms is not strictly standardized in the art. For purposes of this discussion, acronyms therefore will be defined as follows:

Advanced Intelligent Network (AIN)
Application Programming Interface (API)
Central Office (CO)
Common Channel Inter-office Signalling (CCIS)
Common Channel Signalling Network (CCSN)
Data and Reporting System (DRS)
Integrated Service Control Point (ISCP)
Integrated Services Digital Network (ISDN)
Intelligent Peripheral (IP)
Maintenance and Operations Center (MOC)
Multi-Services Application Platform (MSAP)
Operations, Administration and Maintenance (OAM&P)
Service Control Point (SCP)
Service Creation Environment (SCE)
Service Management System (SMS)
Service Switching Point (SSP)
Signaling Transfer Point (STP)
Simplified Message Desk Interface (SMDI)
Transaction Capabilities Applications Protocol (TCAP)

BACKGROUND OF THE RELATED ART

AIN networks were developed to meet the functional needs associated with the provision of voiceband telecommunications services. See, for example, Berman et al., "Perspectives on the AIN Architecture," IEEE Communications Magazine, February 1992, pp. 27–32. Network interaction with users in these networks can be provided through participant interaction resources residing in an intelligent peripheral. FIG. 1 illustrates the basic configuration of an AIN network having an intelligent peripheral separate from and connected to central office switching systems.

Since the AIN network was a narrowband voice network, the resources were generally items related to the announcement and digit functions generally required for certain specific alternative telephone call processing services. For example, a caller may be prompted by a tone or speech announcement to enter a personal identification number (PIN) before obtaining a selected service or modifying certain stored parameters relating to the subscriber's AIN service.

As a consequence, intelligent peripherals providing the resources are generally composed of narrowband inputs and outputs and processing related to telephone call connection processing, voice messaging, etc. Intelligent peripherals were generally prefered to switch based announcements in which a switching office of the public telephone network generates the announcements from some internal platform for a number of reasons. First the capacity of the internal announcement platforms were somewhat limited, thereby limiting the number and variety of announcements which an AIN service could utilize and sometimes preventing, for example, subscribers from customizing the announcements for their own personalized services.

Adding extra announcement capacity to a number of different telephone switching offices was expensive and often the needed extra announcement equipment could be obtained only from the original switch vendor, in view of the need for compatibility of such equipment with the switch itself. Also, any service specific announcements typically had to be loaded onto each switch providing the particular AIN service. Loading new announcements on large numbers of switching systems could be time consuming and sometimes requires the services of expert personnel provided only by the switch equipment vendor.

Intelligent peripherals are readily adaptable platforms capable of adding and changing announcements to an AIN, without direct addition of equipment in each central office switching system. They provide centralized announcement capabilities to some extent, so that announcement reprogramming does not always require reprogramming some equipment for every single switch through which an enhanced service was offered. However, intelligent peripherals also isolated the AIN functions to some extent so that as telephone networks evolved to contain added broadband communications capabilities, those capabilities were not supported by corresponding broadband functions in the intelligent peripherals designed for the original voice band telephone network.

In a typical implementation of intelligent peripherals in an Advanced Intelligent Network, shown in FIG. 3, each central office switching system (CO) 11, 13, 15, 17 is labeled as an "SSP." The Service Switching Points, referred to as SSP's, are appropriately equipped programmable switches present in the telephone network, which recognize AIN type calls, launch queries to the ISCP and receive commands and data from the ISCP to further process the AIN calls. In the illustrated embodiment, the CO-SSP's are end offices.

All of the end office switches 11, 13, 15 and 17 are equipped and programmed to serve as SSP's. The illustrated implementation makes a variety of Advance Intelligent Network AIN services widely available at the local office level throughout the network. Other AIN implementations provide the SSP functionality only at selected points in the network, and end offices without such functionality forward calls to one of the SSP's.

SSP capable central office switching systems typically consist of a programmable digital switch with CCIS communications capabilities. One example of an SSP capable CO switch is a 5ESS type switch manufactured by AT&T; but other vendors, such as Northern Telecom and Seimens, manufacture comparable digital switches which could serve as the SSP's.

A simplified block diagram of the structure of an exemplary electronic program controlled switch which may be used as any one of the SSP type CO's is shown in FIG. 2. As illustrated, the CO switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc.

Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 includes an administrative module processor 61, which is a computer equipped with disc storage 63, for overall control of CO operations. The administrative module processor 61 communicates with the interface modules 51 through the communication module 55. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signalling link between the administrative module processor 61 and an SS#7 network connection to an STP or the like (see FIG. 1), for facilitating call processing signal communications with other CO's and with the ISCP 40.

As illustrated in FIG. 2, the administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disc storage 63 together with routing information and any temporary information needed for processing the call. For example, for a switch based Centrex type service, the call store 67 would receive and store extension number translation information for the business customer corresponding to an off-hook line initiating a call. The program store 69 stores program instructions which direct operations of the computer serving as the administrative module processor.

Although shown as telephones in FIG. 3, the terminals can comprise any communication device compatible with the line. Where the line is a standard voice grade telephone line, for example, the terminals could include facsimile devices, modems etc.

The SSP type CO's 11 and 13 connect to a first local area STP 23, and the SSP-CO's 15 and 17 connect to a second local area STP 25. The connections to the STP's are for signalling purposes. As indicated by the circles below STP's 23 and 25, each local area STP can connect to a large number of the SSP-CO's. The central office SSP's are interconnected to each other by trunk circuits (illustrated in FIG. 3 as bold lines) for carrying telephone services.

The local area STP's 23 and 25, and any number of other such local area STP's (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches. Also, certain switching offices within the network, whether SSP's or not, may function primarily as tandem type offices providing connections between trunk circuits only.

The links between the central office switching systems (CO's) and the local area STP's 23 and 25 are typically SS#7 type CCIS interoffice data communication channels. The local area STP's are in turn connected to each other and to the regional STP 31 via a packet switched network. The regional STP 31 also communicates with the ISCP 40 via a packet switched network.

As shown in FIG. 3, the ISCP 40 includes a Service Management System (SMS) 41, a Data and Reporting System (DRS) 45 and the actual database referred to as the Service Control Point (SCP) 43. The ISCP also typically includes a terminal subsystem referred to as a Service Creation Environment or SCE 42 for programming the database in the SCP 43 for the services subscribed to by each individual customer. These components of the ISCP 40 communicate with each other via a token ring network 44.

The illustrated embodiment includes two signalling communications systems carrying data to and from the ISCP 40. The communications links of the first such signalling network appear in the drawing as dashed lines, and the communications links of the second such signalling network appear in the drawing as lines formed by parallel bars. The first signalling network provides communications between the ISCP 40 and the SSP's 11, 13, 15, 17 and between the individual SSP's 11, 13, 15, 17. The second signalling network provides communications between the ISCP 40 and the IP's 35, 37. More specifically, the SCP 43 connects to the SSP's via the SS#7 network and the STP's 44. For the second signalling communication system a router shown as a small rectangle on the ring 44 provides a two-way communication connection to a data network, for example an Ethernet (IEEE 802.3) type local area network, another token ring, or a mixture of token ring and local area network, etc., going to the individual IP's 35, 37. The second signalling communication system uses a protocol referred to as a TCP/IP (Transmission Control Protocol/Internet Protocol). Other types of high speed data network can be used between the ISCP 40 and the IP's 35, 37. Typically, the second signalling network will provide higher capacity data transport than the first signalling communication network.

There are two intelligent peripheral platforms in the exemplary network of FIG. 3. IP 35 connects to two SSP type central office switching systems, 13, 15 and IP 37 connects to one SSP type central office switching system 17. Alternatively, an IP may connect to more than two switching systems or two or more IP's may connect to the same switching office. The precise number of IP's in the network and the number thereof connected to different switching systems is determined by projected traffic demands for IP service features from the subscribers' lines connected to the various switching systems.

The connection from each IP to the associated SSP(s) utilizes a primary rate Integrated Services Digital Network (ISDN) type trunk line for carrying both voice channels and signaling information through an appropriate interface unit in one of the interface modules 51 of the switch (see FIG. 2). However, a number of alternate implementations of this connection can be used. For example, the connection may take the form of a T1 circuit carrying a number of Multi-plexed Centrex line channels. If additional data signalling is necessary from the switch to the IP, a Simplified Message Desk Interface (SMDI) link can be provided. SMDI is a standard form of maintenance port, available on many types of telephone switching systems, through which calling party number information can be supplied.

In its simplest form, each intelligent peripheral platform could be a programmed announcement system for receiving dialed digit information and synthesizing voice announcements in response to command data from the ISCP. For example, the announcement system might include a personal computer with an X.25 interface and a text to speech type voice synthesizer and an ISDN interface. Of course, fully intelligent peripherals provide a variety of additional call processing capabilities, as will be discussed in more detail below with regard to FIGS. 4A and 4B.

A central office switching system or CO shown in FIG. 3 normally responds to a service request on a local communication line connected thereto, for example an off-hook followed by dialed digit information, to selectively connect the requesting line to another selected local communication line. The connection can be made locally through only the connected central office switching system. For example, for a call from station A to station B the SSP-CO 11 provides the call connection without any connection to another central office. When the called line connects to a distant station, for example when station A calls station C, the connection is made through the connected central office switching system SSP-CO 11 and at least one other central office switching system SSP-CO 13 through the telephone trunks interconnecting the two central office switches.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signalling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the local central office (CO) suspends the call and sends a query message through one or more of the STP's. The query message goes to the central office to which the called station is connected, referred to as the "terminating" central office; for example, for a call from station A to station C the query would go from originating SSP-CO 11 to terminating SSP-CO 13. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices (and/or tandem offices) of the network between the calling and called stations. The receiving central office then provides a ringing signal to the called station and sends ringback tone back through the connection to the calling station.

In an Advanced Intelligent Network (AIN) type system, such as shown in FIG. 3, certain calls receive specialized AIN type processing under control of data files stored in the SCP database 43 within the ISCP 40. In such a network, the SSP type local offices of the public telephone network include appropriate data in the translation tables for customers subscribing to AIN services to define certain call processing events identified as AIN "triggers". Using the translation table data from disc memory 63, the SSP will detect such triggering events during processing of calls to or from such AIN service subscribers.

The SSP type switches can recognize a variety of events as triggers for activating a query and response type AIN interaction with the ISCP. A number of different AIN triggers are used, depending on the precise type of service the AIN will provide a particular subscriber. For example, if a subscriber has a speech responsive autodialing service, an off-hook immediate trigger might be stored in the translation table file for that subscriber in the SSP. The SSP would detect the trigger each time the subscriber goes off-hook on that line and then attempt to obtain further instructions from the ISCP.

For ordinary telephone service calls, there would be no event to trigger AIN processing; and the local and toll office switches would function normally and process such calls as discussed above, without referring to the SCP database for instructions. In a first mode of operation, an SSP type office (CO or tandem) which detects a trigger will suspend call processing, compile a TCAP formatted call data message and forward that message via a common channel interoffice signalling (CCIS) link and STP(s) to the ISCP 40 which includes the SCP database 43. The ISCP accesses its stored data tables to translate the received message data into a call control message and returns the call control message to the office of the network via CCIS link and STP(s). The SSP then uses the call control message to complete the particular call through the network. For AIN calls requiring a processing feature provided by the intelligent peripheral platform, the call control message would instruct the SSP to route the call to the associated intelligent peripheral platform.

In the network of FIG. 3, the ISCP 40 transmits a "SEND to RESOURCE" type TCAP message instructing an SSP, such as SSP 17, to access a resource and collect digits. This message identifies a particular resource, in this case an ISDN type voice channel to the associated intelligent peripheral announcement platform 35 or 37. Each time the ISCP sends such a "SEND to RESOURCE" message to an SSP, the ISCP concurrently sends a message through the second communications system to the associated intelligent peripheral announcement platform. This message tells the platform what message to play on the specified ISDN channel at that time. If the message announcement platform has a text-to-speech converter, the announcement could take the form of virtually any desired script.

There are AIN topologies other than the one illustrated in FIG. 3. For example, some of the end offices in an AIN may not have SSP capabilities. Each such end office connects to a trunk which in turn feeds calls to a tandem switching system with SSP capabilities. The SSP tandem communicates with the ISCP, as in the implementation described above. For the SSP capable end office switches that may be present in the network, they communicate directly with the ISCP, in the same manner as in the embodiment of FIG. 3. In such networks, each intelligent peripheral platform connects to one or more of the non-SSP end offices, one or more SSP capable end offices and/or to the SSP capable tandem. The SSP capable tandem office switch is a digital switch, such as the 5ESS switch from AT&T; and the non-SSP type end offices might be 1A analog type switches.

However, each of these networks is a narrowband voice communication network, and each SSP is a narrowband switching system. No provision is made for broadband communications, such as video dialtone, in these networks and the elements in the network, including the intelligent peripherals, are narrowband elements. Consequently, even if broadband communications are made available to the AIN, the enhanced services utilizing the intelligent peripherals can not be implemented for the broadband communications.

FIG. 4A illustrates an exemplary IP used in the network of FIG. 3. The IP consists of two or more general purpose computers 101A, 101B, such as IBM RS-6000's. Each general purpose computer includes a digital voice processing card for sending and receiving speech and other audio frequency signals, such as an IBM D-talk 600. Each voice processing card connects to a voice server card 103A or 103B which provides the actual interface to T1 or primary rate interface ISDN trunks to the SSP type switching office. The plurality of computers may have associated dedicated disk storage 105A, 105B, and the IP will included a shared disk memory 107. Each computer will also include an interface card for providing two-way communications over an internal data communications system, an Ethernet type local area network 109. The Ethernet carries communications between the individual computers and between the computers and a router which provides an interconnection to the second signalling communications network going to the ISCP. The IP may also include another general purpose computer 115 configured as a terminal subsystem, for use as a maintenance and operations center (MOC) and providing operations personnel access to the IP. The number of processors provided in the IP and the number of voice servers will depend on project service demands. One additional processor and associated voice server will be provided as a backup.

Each general purpose computer 101A, 101B will run a node manager, an IP/ISCP Interface program, appropriate voice processing software and a variety of application software modules to offer the proposed services of the IP. The central administrator or "Node Manager" program module, running on each computer, will monitor and control the various IP resources and operations.

The digital voice processing card and associated software will provide speech synthesis, speech recognition capabilities and DTMF tone signal reception, for use in a number of different applications. The speech synthesis and DTMF tone signal reception, for example will replace the announcement and digit collection functions of the SSP switches in various existing AIN services. The general purpose computers and associated circuits will also run a variety of other types of service program modules, for example a voice mail server module and/or a fax mail server module.

FIG. 4B illustrates an alternate embodiment of the IP used in the network of FIG. 3. The alternate architecture utilizes separate modules for different types of services or functions, for example, one or two Direct Talk type voice server modules 203A, 203B for interfacing the trunk to the SSP, a separate module 205 for speech recognition, a server module 209 for voice mail, and another server 207 for fax mail services, etc. The various modules communicate with one another via an data communication system 210, which again may be an Ethernet type local area network.

The Direct Talk modules 203A, 203B provide voice message transmission and dialed digit collection capabilities, as in the earlier embodiment. The modules 203A, 203B also provide line interfaces for communications to and from those servers which do not incorporate line interfaces. For example, for facsimile mail, the Direct Talk module connected to a call would demodulate incoming data and convert the data to a digital format compatible with the internal data communication network 210. The data would then be transferred over network 210 to the fax server 207. For outgoing facsimile transmission, the server 207 would transfer the data to one of the Direct Talk modules over the network 210. The Direct Talk module would reformat and/or modulate the data as appropriate for transmission over the ISDN link to the SSP. The Direct Talk modules provide a similar interface function for the other servers, such as the voice mail server 209.

The illustrated IP also includes a communication server 213. The communication server 213 connects between the data communication system 210 and the router 211 which provides communications access to the second signalling communication system and the ISCP 40 and other IP's which connect to that signalling communication system. The communication server 213 controls communications between the modules within the IP and the second signalling communication system.

In each of the above architectures, the SSP switch would route calls to the different elements of the IP in response to instructions from the ISCP. In the initial implementation using general purpose computers (FIG. 4A), each of which offers all service functionalities, the decision to route to a particular one of the computers would be a resource availability/allocation decision. If necessary data can be exchanged between the computers via the internal data communications network, e.g. if a message for a particular subscriber's service is stored in the disc memory associated with one computer but the other computer is actually processing the call. In the second implementation (FIG. 4B), however, the ISCP would instruct the SSP to route the call to the particular line to the specific module capable of providing a calling customer's individual service. For example, if the subscriber has some form of speech recognition service, the call would be routed to the speech recognition module 205. If the subscriber has a voice mail service, however, the ISCP would instruct the SSP to route the call to one of the lines going to one of the voice server modules 203A, 203B. The module 203A, or 203B would receive outgoing voice messages from the voice mail server 209 for transmission to the caller. The module 203A or 203B would decode DTMF signals and supply appropriate data to the voice mail server, for control purposes. The module 203A or 203B would also format incoming voice messages for transmission over internal network 210 and storage by server 209.

Specific proposals have been made for the intelligent peripherals. For example, U.S. Pat. No. 4,827,500 to Binkerd et al discusses an announcement point which provides messages to callers, receives dialed digits and/or speech signals for input information from callers and exchanges appropriate data with a remote central 800 number database. The communication between the announcement point and the 800 database apparently goes through the same interoffice signalling network used in routing of calls between switching offices. A substantially similar network is discussed in Weisser et al., "The Intelligent network and Forward-Looking Technology," IEEE Communications Magazine, December 1988, pp. 64–69.

U.S. Pat. No. 5,208,848 to Pula teaches connection of one or more Intelligent Peripherals to a single switch. Reprogramming announcements for a new service presumably would require reprogramming each IP connected to each switch in the network. Also, although Pula discusses a common channel signaling link to the switch, there is no specific suggestion of any interaction of the IP with a higher level data base. As in the Binkerd et al. patent, if any interaction with a higher level database were added, the added communication traffic to that database would have to go through the common channel signaling link and would increase traffic loading on that critical link.

U.S. Pat. No. 5,206,901 to Harlow et al. discusses a service circuit node which plays announcements, collects digits and communicates with an Service Control Point (SCP) database to update intelligent network service files. The service circuit node serves a plurality of switching offices, apparently by routing calls through the public switched telephone network to the one service circuit node. Attention is also directed to Shah et al., "Application of a New Network Concept for Faster Service Deployment," International Conference on Communications '88, Jun. 12–15, 1988, IEEE Communications Society, Conference Record, Volume 3, pp. 1327–29.

The communications between the service circuit node and the SCP in these systems apparently go over the interoffice signalling network which carries queries and responses between switching offices and the SCP, and creates increased traffic on the signaling network. Any new node added to the AIN network to offer the enhanced announcement capabilities and other service features, through interactions with the central database and other systems, should not increase traffic on the interoffice signaling network and/or the network which carries signaling traffic between the database and the network switching systems, as in the prior art networks.

Intelligent peripherals may also facilitate still further enhanced features, such as services based on speech recognition, mail services, etc., without requiring addition to or modification of equipment within the central office switching system for each such further enhanced service feature. However, the use of intelligent peripherals in AIN networks has also raised problems. Intelligent peripherals provided by vendors are often costly closed systems providing disparate single point solutions with separate OA&M interfaces, non standard billing and limited enhancement potential. Frequently, when a large number of intelligent peripherals are deployed in an AIN network, they are unable to send messages between themselves or otherwise interact with each other.

Moreover, intelligent peripherals are usually dedicated to a single application, such as providing voice announcements or voice mail, and perform only predetermined processing or other functions. In particular, intelligent peripherals are typically capable of providing either narrowband services or broadband services, but not both.

BRIEF SUMMARY OF THE INVENTION

It is therefore an object of the present invention to provide an intelligent peripheral platform which overcomes the aforementioned disadvantages.

It is an object of the present invention to provide an intelligent peripheral platform which is capable of efficiently performing a number of different narrowband and broadband applications.

It is an object of the present invention to provide an intelligent peripheral which is consistent with AIN network evolution, has an open architecture and system design with standard interfaces, and delivers lower cost and higher performance in a vendor independent platform.

It is also an object of the present invention to provide an intelligent peripheral which merges computer and telephony technologies, provides an application programming interface for multi-application capability and provides fault tolerant reliability.

It is also an object of the present invention to provide an AIN network having a number of intelligent peripherals with seamless integration/migration and interaction between services, cross service notification, and a universal mailbox for ubiquitous messaging.

It is a further object of the present invention to provide an intelligent peripheral containing a gateway switch for providing both narrowband and broadband services.

In the present invention, an intelligent peripheral platform offering narrowband and broadband auxiliary call processing and/or enhanced auxiliary service features connects to one or more switching systems as well as a broadband communication network and is in data communication with the service control point database. Preferably, there is a second signalling communication system, separate from the central office switching systems, which provides two-way data signalling communications between the intelligent peripheral platform and the services control point.

The second signalling communication system also permits exchange of messages between the intelligent peripheral platforms. When a network includes a plurality of intelligent peripheral platforms, each one may connect to only one switching system or to a number of the switching systems. Each such platform provides one or more auxiliary call processing or enhanced service features in response to instructions from the services control point.

The combination of a plurality of intelligent peripheral platforms and a separate second signalling network permits exchange of messages between platforms, without the need to establish a call connection between the intelligent peripheral platforms through the switching systems and without adding excessive message traffic to the existing signalling network. For example, if the intelligent peripheral platforms offer a voice mail service or the like, a subscriber who is away from his home region could call in and access the intelligent peripheral platform servicing the area the subscriber is currently in. Typically, this would involve only a local call. The intelligent peripheral platform servicing the area the subscriber is currently in would access the subscriber's mailbox in the intelligent peripheral platform in the subscriber's home region. If the home region intelligent peripheral platform has stored any messages for play back to the subscriber, that intelligent peripheral platform would transmit the messages through the separate second signalling network to the intelligent peripheral platform servicing the area the subscriber is currently in. Upon receipt of the messages, that intelligent peripheral platform would provide playback to the subscriber over the local telephone connection.

Voice mail systems may be connected to the SS7 common channel interoffice signaling network with callers accessing the voice mail systems through the public switched telephone network in the normal manner to leave, edit and retrieve messages. When message exchange between systems is needed for some particular requested service, the voice mail systems exchange stored messages in non-real time as packet data transmitted through the SS7 network. Although the IP connects through voice and data lines to a Service Switching Point (SSP) type central office switch, it is preferable that instead of the message exchange going through trunks or through the SS7 network, the voice mail message transfers go by dedicated data lines to the end office switch and from there to the IP through some form of dedicated data link, such as an "F-link."

In operation, a voice mail system stores a message from a caller received through the telephone network in the normal manner. Afterwards, the voice mail system transmits the message as packetized data through the data link to the IP. The IP stores the message for further processing. The IP may provide protocol conversion or actual translations on the message. For example, if the message is a voice message, the IP may execute a speech recognition routine to convert the message to text for subsequent transmission to a text mail system for actual delivery.

While the message is stored in the IP, the sender may call in to the IP and request further processing, e.g., to edit the message before transmission to its destination. If the intended recipient has only voice type mail, the IP will leave a voice message in the recipient's mailbox advising the party to call the IP directly to retrieve a stored text message. The call to the IP can go through a POTS line and utilize modems, or the call can be a data call and utilize the data link from the SSP to the IP.

Specific basic architectures for the intelligent peripheral platform are disclosed. One version uses general purpose computers with appropriate line interfaces. The software run by the computers offers a variety of different enhanced service features, such as voice mail, facsimile mail, voice recognition, etc. The second version includes a number of separate modules for specific identified service features, e.g. a voice mail server, a facsimile mail server, etc. The third version contains a number of different modules as well as a central control computer for performing standard functions. A fourth embodiment is similar to third version, except that it contains a gateway switch capable of accepting both broadband and narrowband information through trunk and/or line interfaces.

The gateway switch provides selective routing of incoming calls over network line or trunk connections to the various internal processing or communications modules. For enhanced operations, some modules may provide narrowband type services, e.g. voice message processing, and other modules would provide broadband processing, e.g. video. The gateway switch includes one section for narrowband and another for broadband. The gateway switch also connects to a broadband network, such as an asychronous transfer mode (ATM) network, to provide access to other services, e.g. from a video information provider.

Additional objects, advantages and novel features of the invention may be set forth in part in the description which follows, and may become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENTS

The present invention is primarily concerned with the provision of enhanced AIN services for a network having both broadband and narrowband communications in a telephone network. In the preferred embodiment of an AIN network according to the invention, the concept is implemented in an intelligent peripheral containing a gateway switch which receives both broadband and narrowband information over trunks and telephone lines and a common connection to a number of processing modules for providing enhanced services for both broadband and narrowband information. Before discussing such an intelligent peripheral in detail, the fundamental aspects of the concept can be best understood by first referring to FIG. 6.

Figure 6:
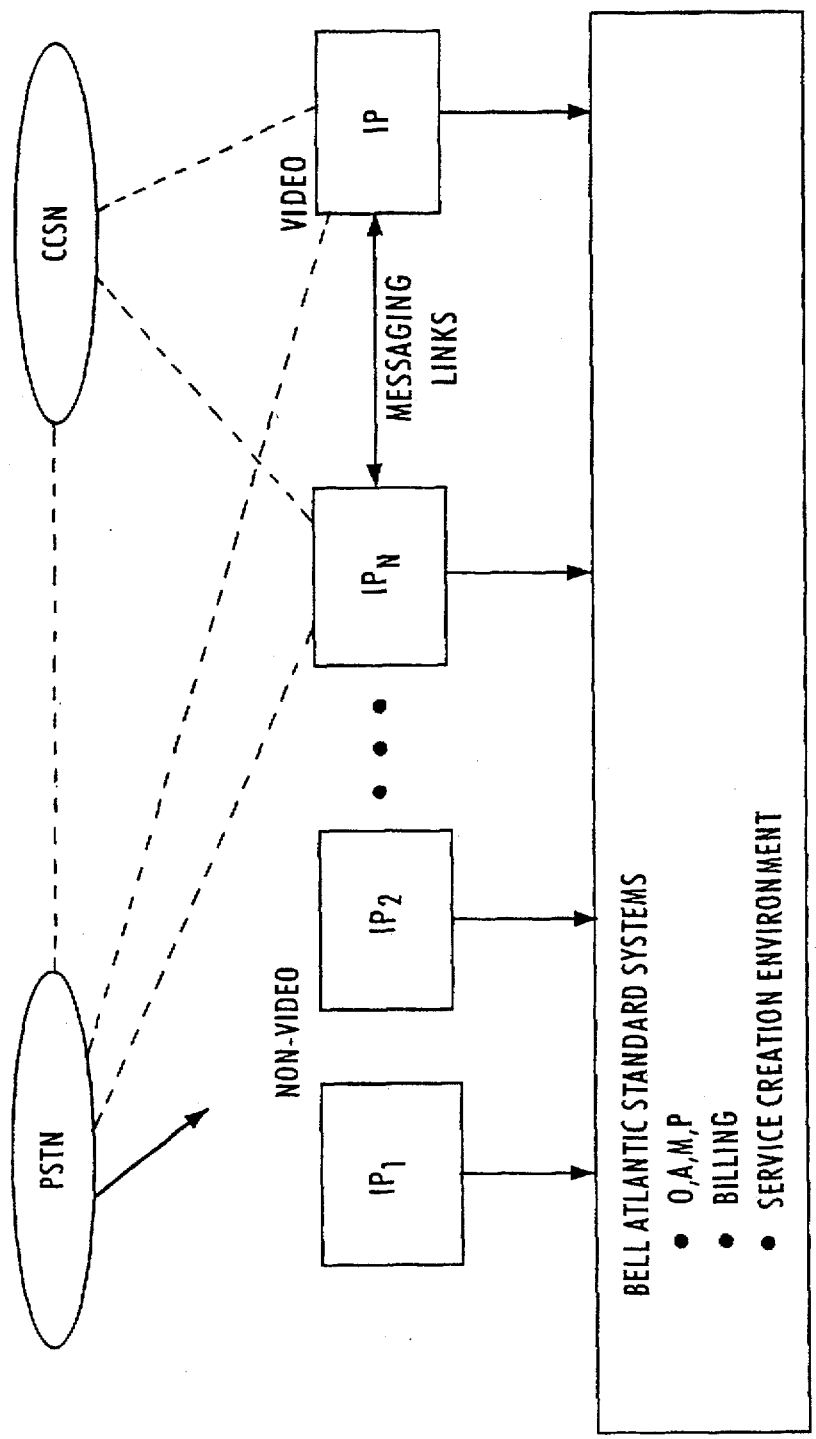
FIG. 6 is a schematic block diagram illustrating an implementation of a plurality of non-video intelligent peripherals with a video intelligent peripheral.

FIG. 6 is a block diagram useful in illustrating a rudimentary implementation of the above concept in an AIN network which uses a number of intelligent peripherals to provide enhanced services for both narrowband and broadband data. Several different non-video narrowband intelligent peripherals $IP_1$ to $IP_N$ and a broadband video intelligent peripheral IP are operated independently but connected in parallel, each one separately receiving information from the PSTN and signalling information from the CCSN, and carrying out different functions or applications. Each intelligent peripheral is able to provide enhanced services for either one of narrowband or broadband data, but not both.

Such a network is able to conduct enhanced services for both narrowband and broadband video communications by sending narrowband information to a non-video IP and broadband video information to video IP.

However, the network shown in FIG. 6 is somewhat inefficient because different intelligent peripherals must be used for narrowband and broadband communications and a central control computer must be used in common to perform standard functions such as OAM&P, billing and SCE. Messaging links are transferred between the intelligent peripherals, but there is otherwise no relationship between the intelligent peripherals.

Figure 5:
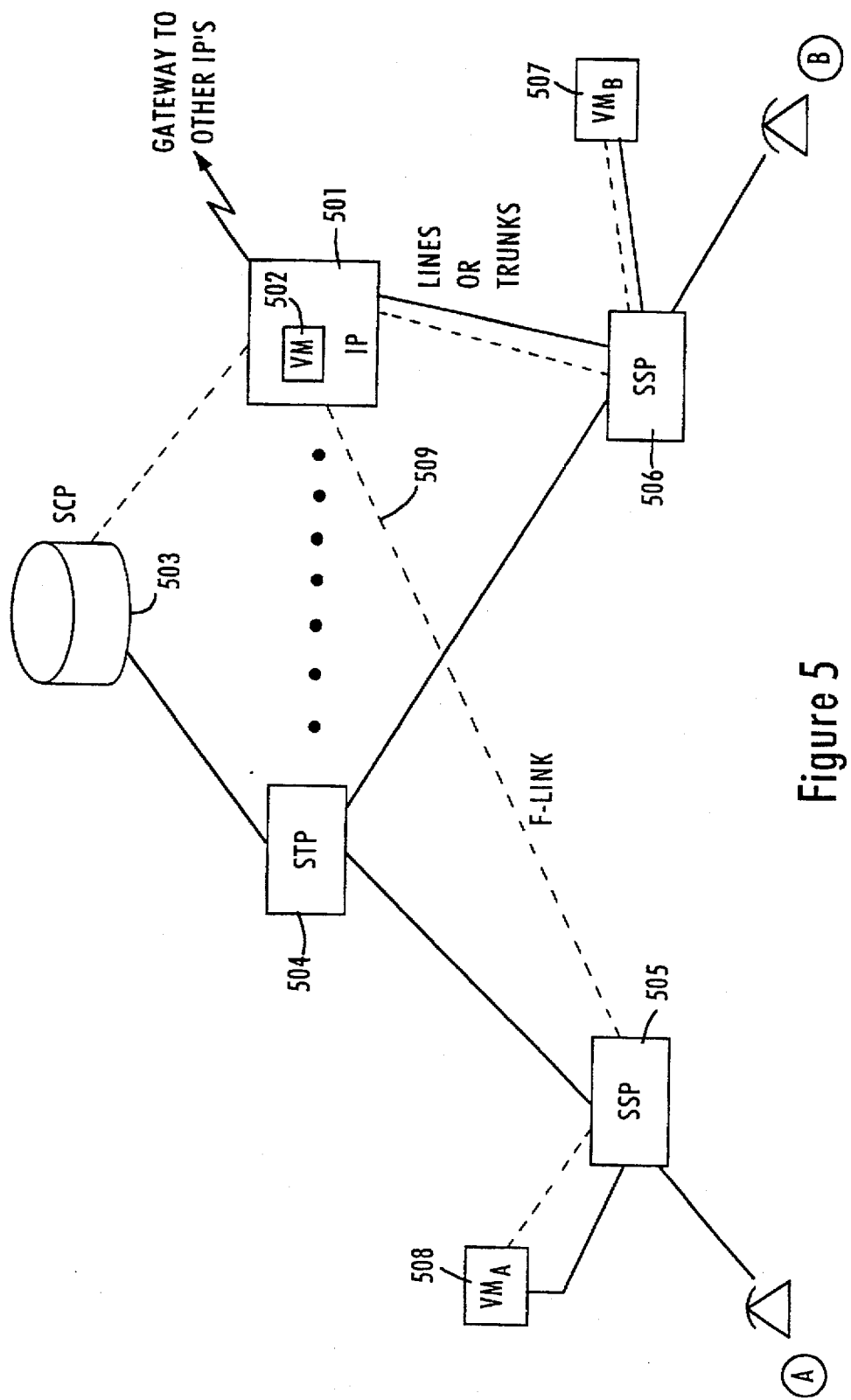
FIG. 5 is a schematic block diagram of a voicemail service implemented using a shared intelligent peripheral in an Advanced Intelligent Network.

The use of messaging links between intelligent peripherals can be advantagous in certain services. For example, FIG. 5 shows a simplified network using an intelligent peripheral to provide a universal voice mail messaging service. A single intelligent peripheral 501 contain a voice mail module 502 serves two separate SSP's 505 and 506. Intelligent peripheral 501 is also connected to SCP 503 and to STP 504 in a manner similar to that described above with respect to FIG. 3 and is connected to other intelligent peripherals (not shown) through a gateway. SSP 505 has an associated voice mail system 508 and a plurality of telephone customers subscribing to the voice mail system represented graphically as subscriber A. SSP 506 has an associated voice mail system 507 and a plurality of telephone customers subscribing to the voice mail system represented graphically as subscriber B. Voice mail systems 507 and 508 may be intelligent peripherals providing voice mail service or may be implemented by other means.

Either voice mail system may be accessed by callers through other SSP's in the public switched telephone network in the normal manner to leave, edit and retrieve messages. When message exchange between systems is needed for some particular requested service, the voice mail systems exchange stored messages in non-real time as packet data.

For example, the shared intelligent peripheral allows subscriber A, who is away from his home region serviced by SSP 505, to call in and access voice mail system 508 through SSP 506 servicing the area of subscriber B and voice mail module 502 of the intelligent peripheral platform 501. Typically, this would involve only a local call. Voice mail system 507 would access subscriber A's mailbox in the voice mail system 508 in subscriber A's home region. If voice mail system 508 has stored any messages for play back to the subscriber, it would transmit the messages to voice module 502 of intelligent peripheral 501. Upon receipt of the messages, intelligent peripheral platform 501 would provide playback to the subscriber over the local telephone connection through SSP 506.

Intelligent peripheral 501 connects through voice and data lines to a Service Switching Point (SSP) type central office switch, but instead of the message exchange going through trunks or through the SS7 network, the voice mail message transfers go by dedicated F-link data lines to the end office switch. An F-link is an SS7 type data connection, but rather than going through the packet switching elements of the network such as the Signaling Transfer Points (STP's), F-links are dedicated direct links between two offices of the telephone network. As such, the F-link connections to the IP are separate from and essentially parallel to the normal SS7 links used for common channel interoffice signaling and communications between the SSP's and the Integrated Service Control Point (ISCP).

In operation, voice mail systems 507 and 508 store a message from a caller received through the telephone network in the normal manner. Afterwards, voice mail system 507 and 508 transmit the message as packetized data through the data link to IP 501. The IP stores the message for further processing. The IP may provide protocol conversion or actual translations on the message. For example, if the message is a voice message, the IP may execute a speech recognition routine to convert the message to text for subsequent transmission to a text mail system (not shown) for actual delivery.

While the message is stored in the IP, the sender may call in to the IP and request further processing, e.g., to edit the message before transmission to its destination. If the intended recipient has only voice type mail, the IP will leave a voice message in the recipient's mailbox advising the party to call the IP directly to retrieve a stored text message. The call to the IP can go through a POTS line and utilize modems, or the call can be a data call and utilize the data link from the SSP to the IP.

Figure 4A:
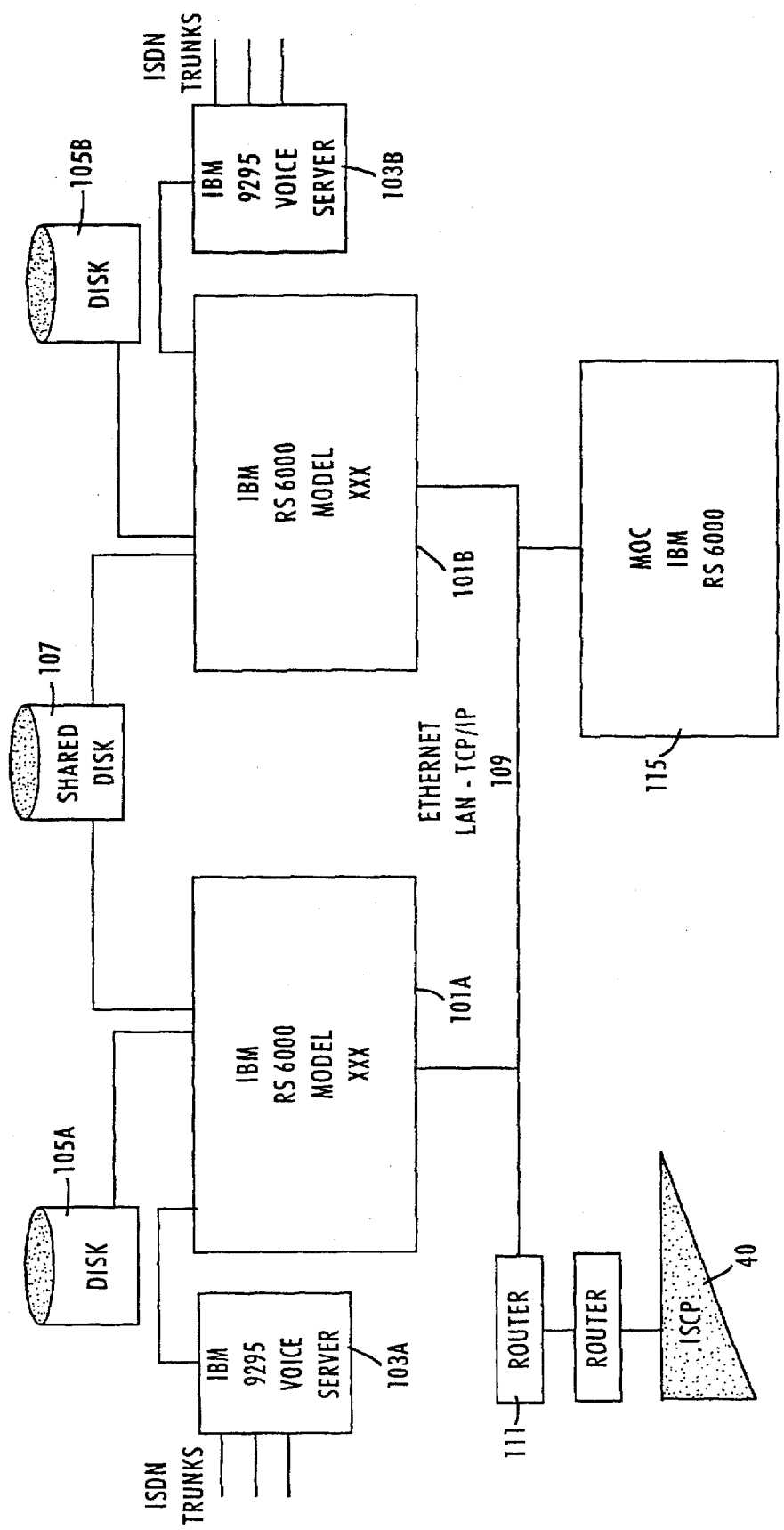
FIG. 4A is a schematic block diagram of one embodiment of an intelligent peripheral platform for use in the Advanced Intelligent Network shown in FIG. 3.
Figure 4B:
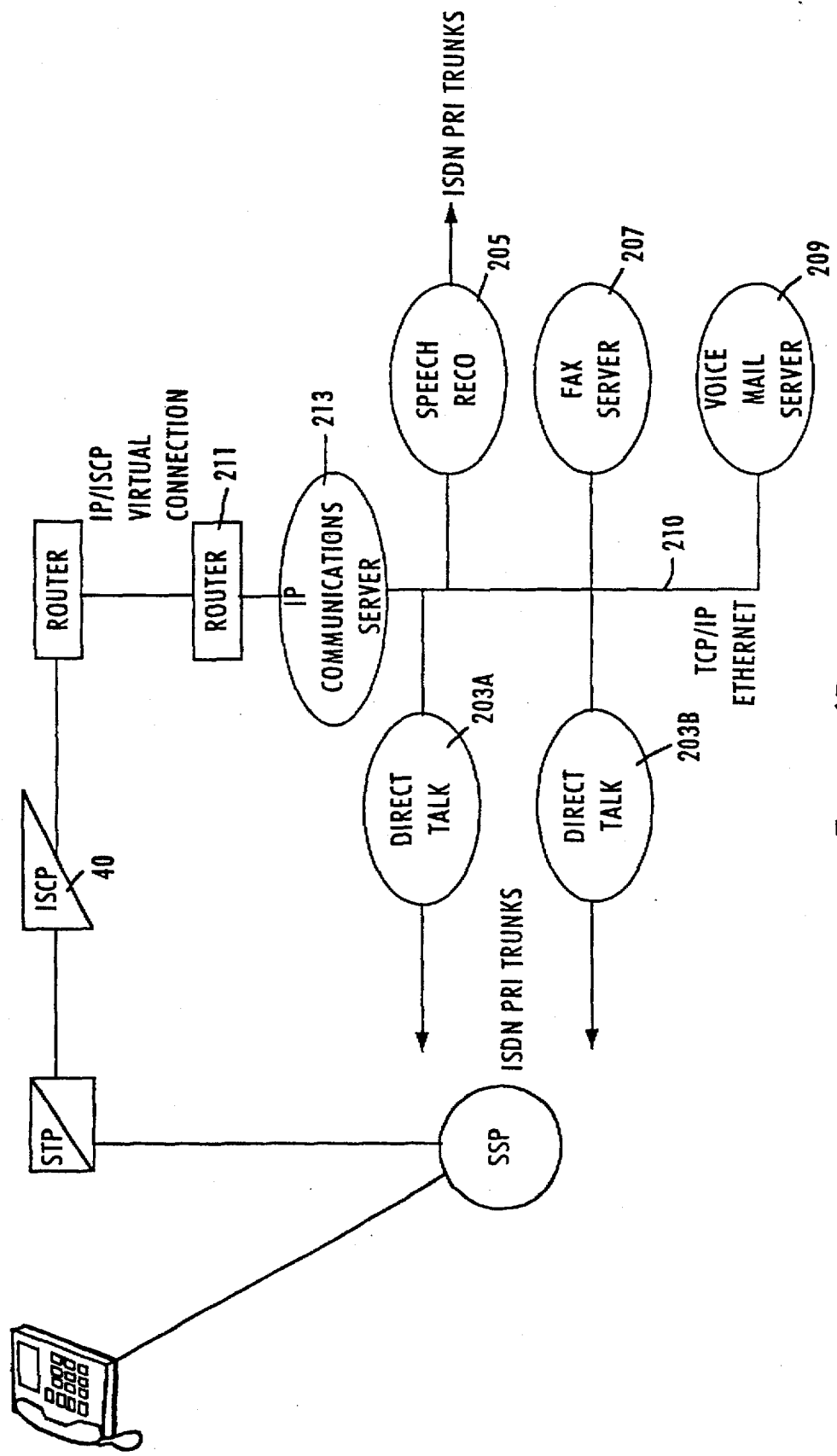
FIG. 4B is a schematic block diagram of an alternate embodiment of an intelligent peripheral platform for use in the Advanced Intelligent Network shown in FIG. 3.
Figure 4C:
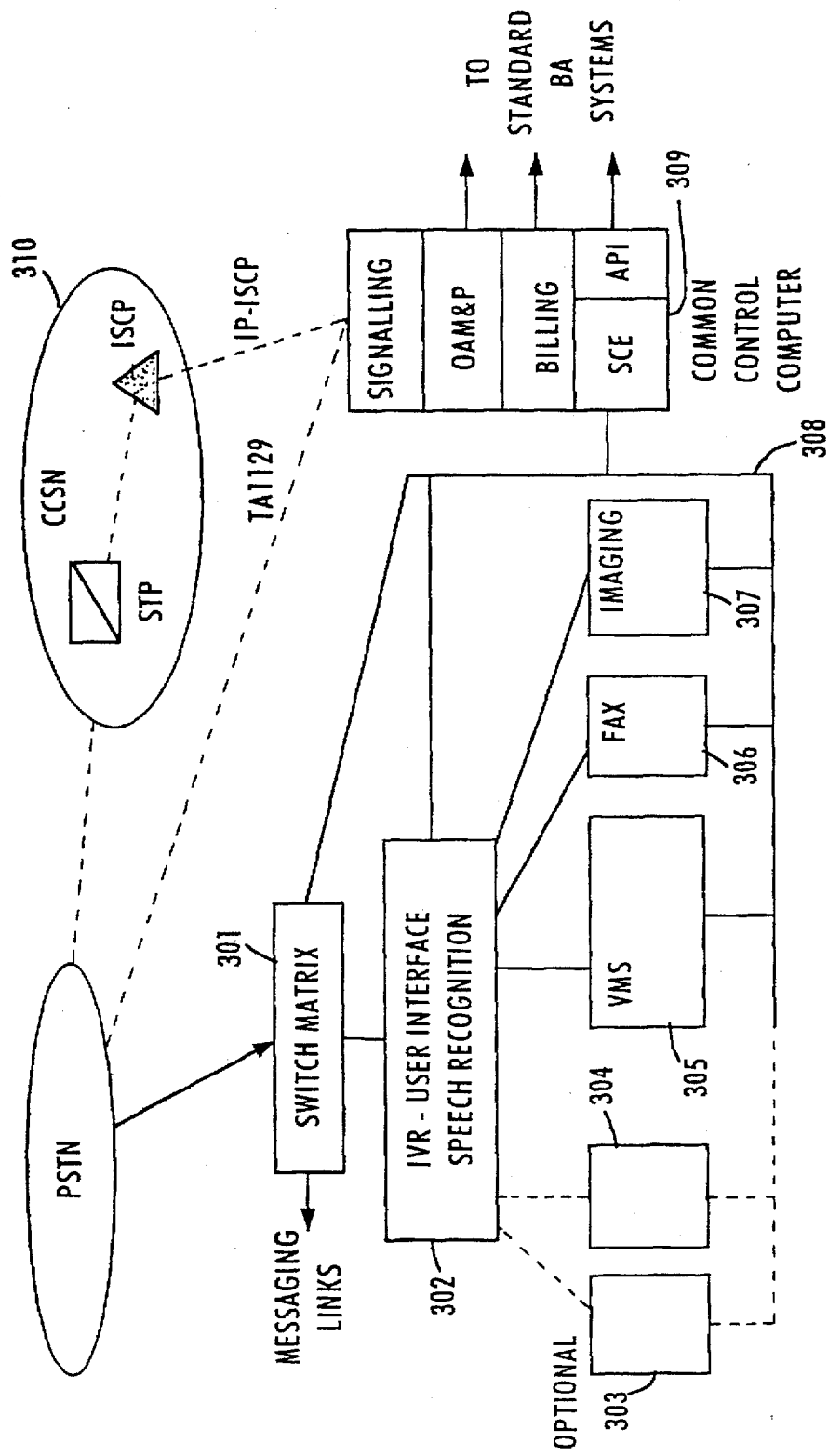
FIG. 4C is a schematic block diagram of another embodiment of an intelligent peripheral platform for use in the Advanced Intelligent Network shown in FIG. 3.

A preferred embodiment of a non-video IP to be used in the network of FIG. 6 is shown in FIG. 4C. Like the embodiment shown in FIG. 4B, it utilizes separate modules for different types of services or functions. It also contains a switch matrix 301 for receiving signals from the public switched telephone network (PSTN) and outputting messaging links. There is no broadband input or output to switch matrix 301 and no split between narrowband and broadband communications.

The narrowband signals received by switch matrix 301 are forwarded to an interactive voice response (IVR)—user interface and speech recognition circuit 302. It also provides for the installation of a number of optional modules, for example, VMS module 305, fax module 306 and imaging module 307. These modules may or may not be similar to those discussed above with respect to FIG. 4B. However, the intelligent peripheral shown in FIG. 4c also contains a common control computer 309 which is in communication with said modules over a common internal data communication network 308. Common control computer 309 is responsible for performing such functions as billing, an application programming interface (API), operations, administration, maintenance (OAM&P) and a service creation environment (SCE). It also carries out signalling over common channel signalling network (CCSN) 310 and to the PSTN using the +1129 protocol.

Figure 4D:
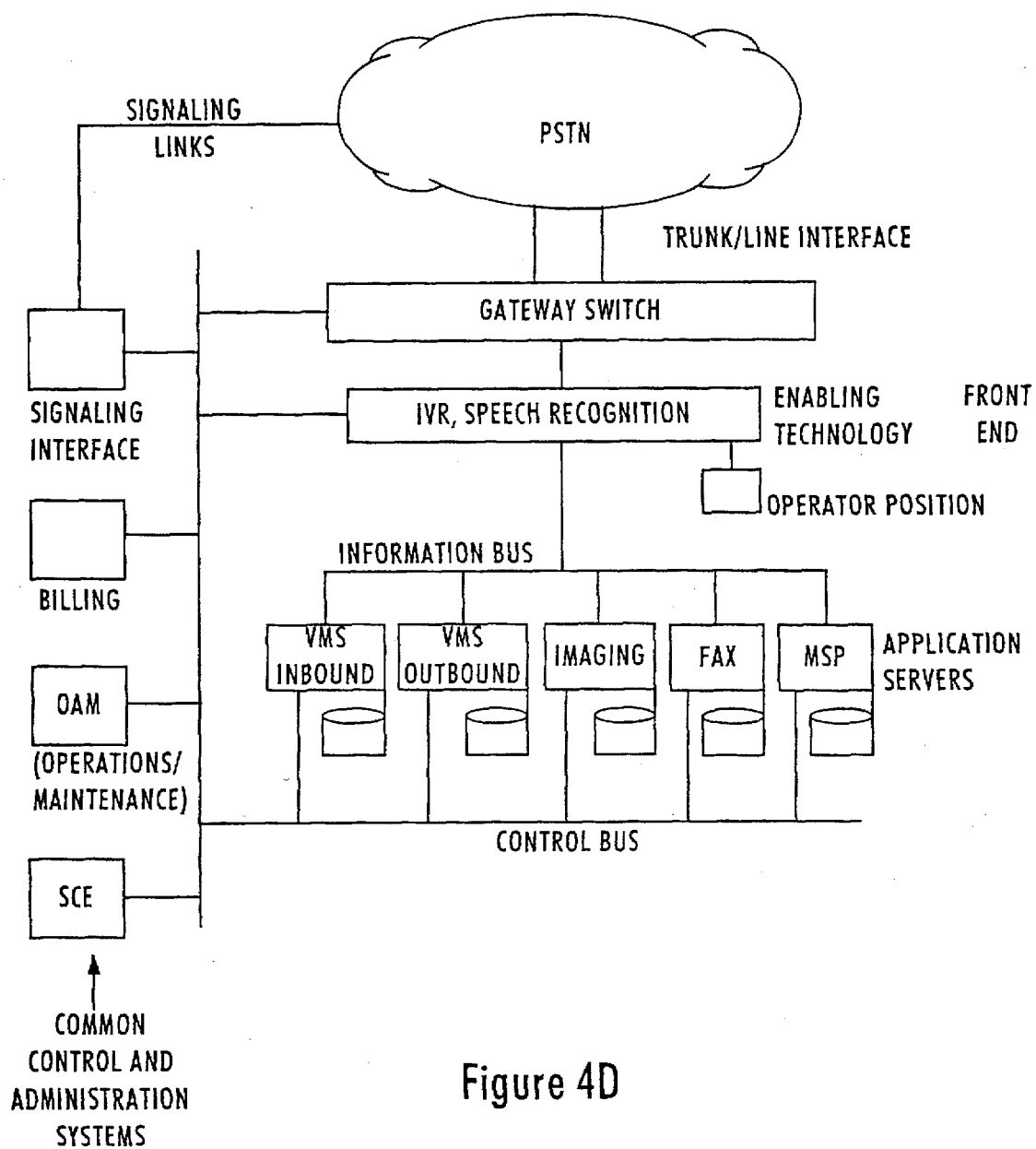
FIG. 4D is a schematic block diagram of an embodiment of an intelligent peripheral platform having a gateway switch for use in the Advanced Intelligent Network shown in FIG. 3.

The embodiment of the intelligent peripheral shown in FIG. 4D is not dissimilar to the one shown in FIG. 4C in some respects. However, it differs primarily in the fact that it receives both broadband and narrowband data from the PSTN through a trunk/line interface in gateway switch 401. The gateway switch is advantagous because it allows the IP to accept video data as well as non-video data. The applications modules in the IP may then include modules for performing enhanced video related services.

Figure 7:
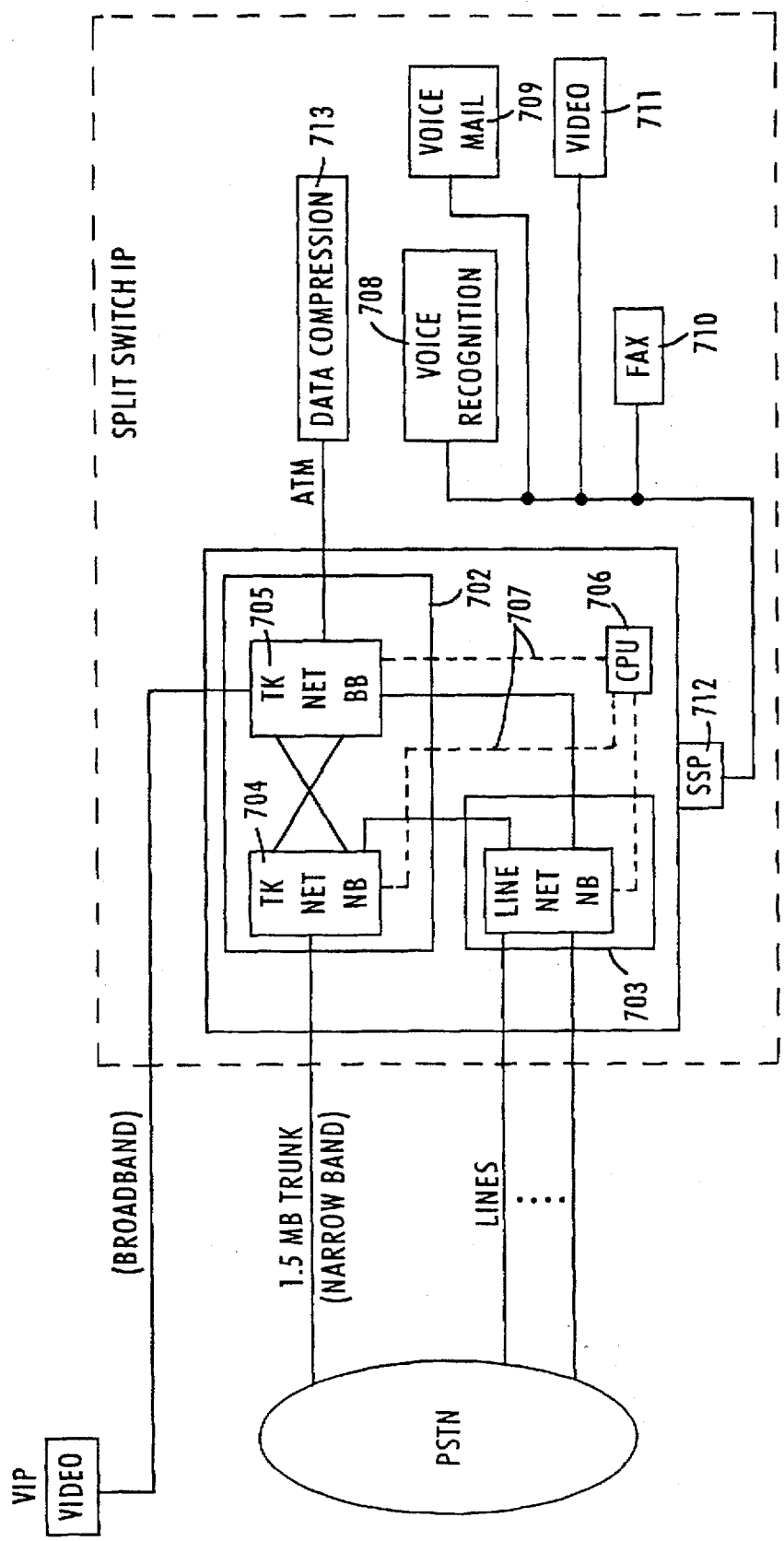
FIG. 7 is a block diagram of an intelligent peripheral showing details of a gateway switch for receiving and splitting broadband and narrowband data.

FIG. 7 shows the preferred embodiment of the intelligent peripheral in FIG. 4D with emphasis on the details of a gateway switch for receiving and splitting broadband and narrowband data. The preferred embodiment shown in FIG. 7 receives a 1.5 Mb/s trunk and a number of telephone lines. However, the IP may be configured so as to receive any number of trunks and/or lines in any configuration. In the gateway switch section 701, there is a trunk module 702 and a line module 703. All of the broadband inputs to the IP are over trunks. The trunk network is separated into narrowband trunk network 704 and broadband trunk network 705. The trunk networks may receive data from any number of different broadband networks such as ATM or SONET and may be constituted of an ATM or other network.

Figure 1:
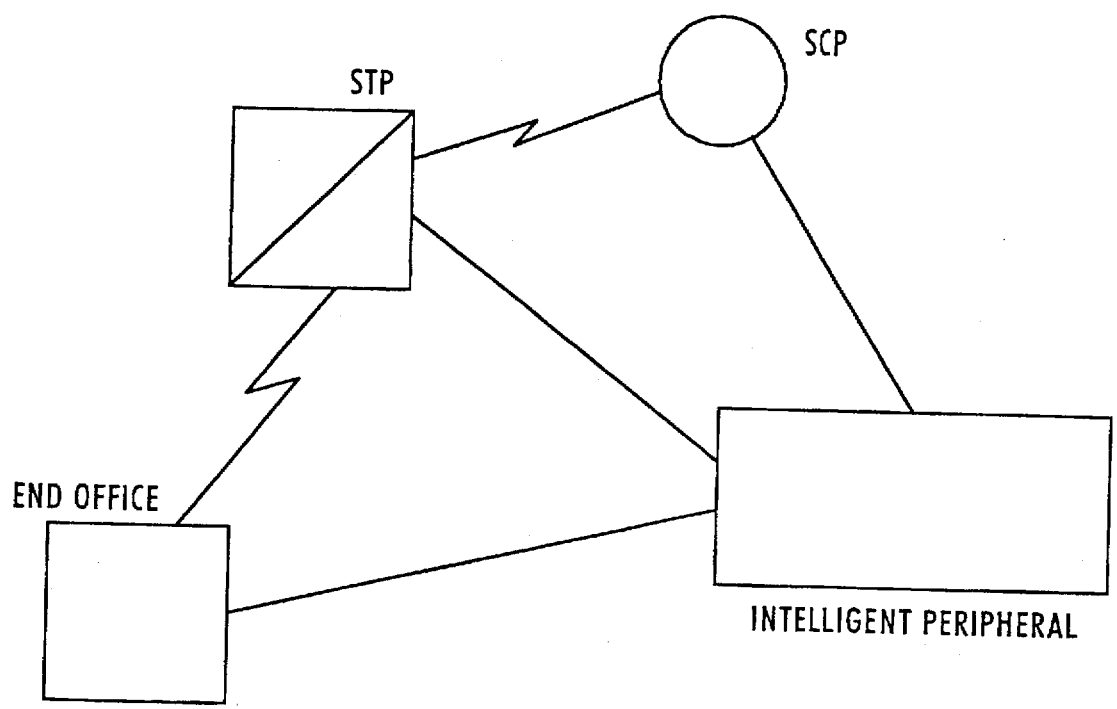
FIG. 1 is a schematic block diagram illustrating the basic configuration of an Advanced Intelligent Network architecture having an intelligent peripheral separate from and connected to central office switching systems.
Figure 2:
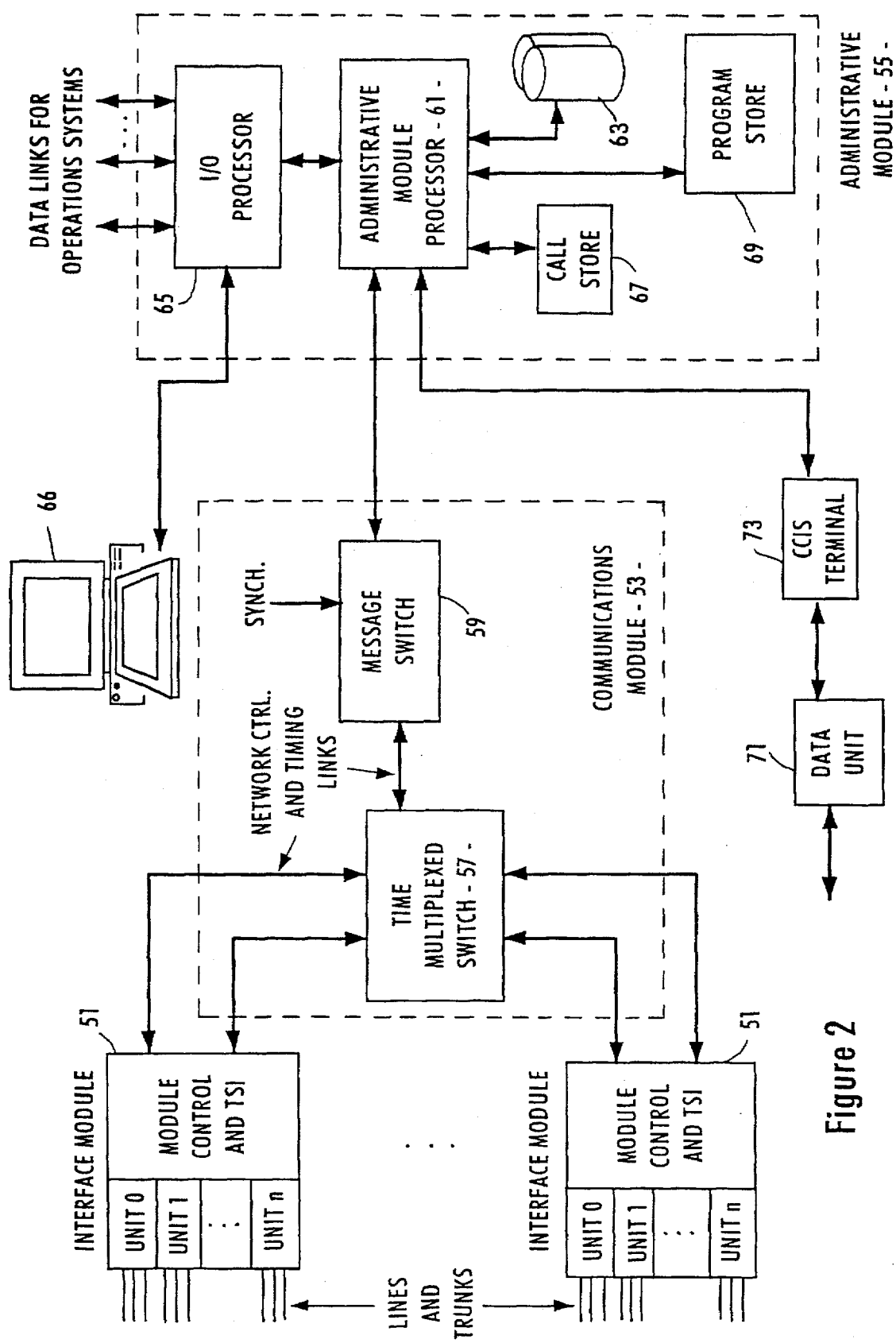
FIG. 2 is a more detailed diagram of one of the SSP type central offices used in the advanced intelligent network of the present invention.

All of the networks are connected to a switch fabric that goes from one to the other. CPU 706 controls activation/deactivation of the switch fabric along control lines 707 between each of the networks. All of the translations and information work through the CPU. The CPU also has an appropriate program and connection to CCIS data terminal and a data unit to communicate via the SS7 signalling network (see, for example, elements 71 and 73 of the SSP shown in FIG. 2). This gives the CPU the capability to communicate with the ISCP and other elements via the SS7 type CCIS network. This includes the capability of transferring voice mail messages over the common channel signaling network or over a dedicated data link as described previously with respect to FIG. 5. Thus, voice mail can come in on, for example, the broadband side through the network or go out and then connect to the SSP right through the switch fabric.

Figure 8:
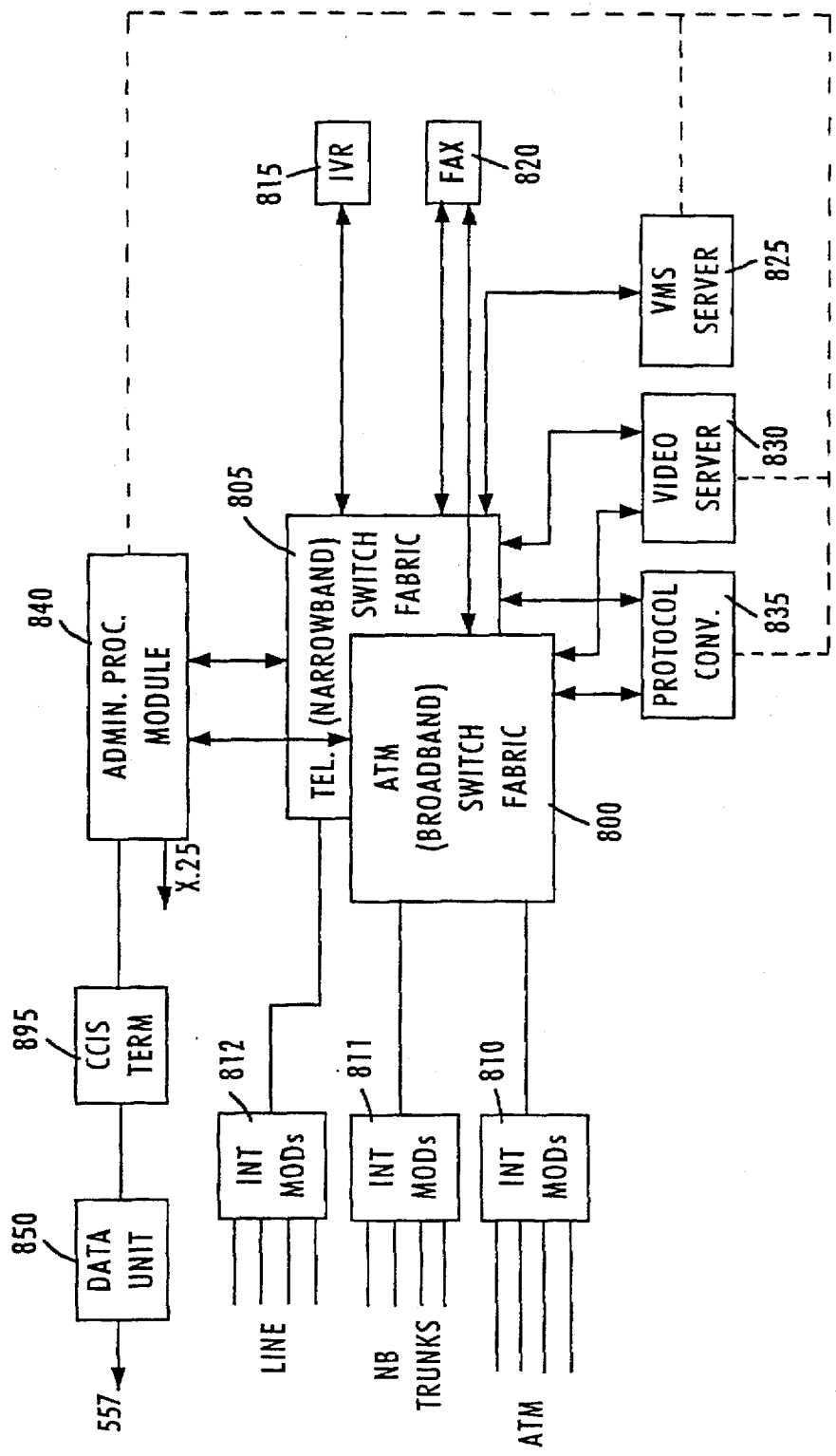
FIG. 8 is a conceptual diagram useful in explaining the operation of the intelligent peripheral shown in FIG. 7.

FIG. 8 is a conceptual diagram useful in explaining the operations of the various elements in the intelligent peripheral shown in FIG. 7. It should be understood that the elements shown in FIG. 8 do not necessarily directly correspond to any hardware or software present in the intelligent peripheral of the preferred embodiment.

The principal elements are the broadband switch fabric 800 (preferably implemented as an ATM network) and the narrowband (preferably voiceband telephone) switch fabric 805. Each switch fabric respectively receives either broadband or narrowband information from a plurality of interface modules 810, 811 and 812. Each of the interface modules 810, 811 and 812 receives broadband ATM data from an external ATM network, narrowband data from trunk circuits, or narrowband data over telephone lines respectively. The interface modules can also output information from either of the respective broadband or narrowband switch fabrics.

Connected to each of the switch fabrics are a plurality of processing modules which interact with one or both of the switch fabrics. The IVR (815), fax (810), video server 830, and voice messaging system (VMS) (825) modules shown in FIG. 8 are merely exemplary and may be substituted or supplemented by other modules. An administrative procedure module (890), similar in function to the module shown in FIG. 2, controls all of the elements and outputs a variety of message signals over a X.25 network or a SS7 signalling network through a CCIS terminal and a data unit.

In addition to the routing functions controlled by the CPU, the intelligent peripheral also contains a controlled protocol converter 835 connected to both of the broadband and narrowband switch fabrics. The acceptance of both narrowband and broadband data, particularly ATM data, requires a protocol converter to perform multiplexing and demultiplexing of received data into form which is acceptable by a processing module or for subsequent output through the gateway switch. For example, for ATM cells, the protocol converter can take off the headers, trailers and other overhead and convert it into SONET, SMDS, T1 or other format incompatible with ATM. The protocol converter contains the internal instructions necessary for temporarily storing the data and then breaking it down into the desired format.

In addition, the protocol converter may convert the incoming data into a format appropriate for one of the internal processing modules. The exemplary intelligent peripheral shown in FIG. 7 has several devices for performing a number of different services such as voice recognition 708, voice mail 709, fax 710, and video 711. The connections from networks 703, 704 and 705 can run through SSP 712 or there may be dedicated connections such as from broadband trunk network 705 to data compression circuit 713.

The protocol converter thus makes it possible to send a video message by receiving a video signal on the broadband side into the narrowband, performing processing on the received video, and then sending it back out to a customer premises over, for example, an ADSL telephone line which will only accept 1.5 Mb/s services.

In an exemplary service taking advantage of the broadband/narrowband gateway switch, an information provider downloads a movie to the IP through a broad band network and the broadband side of the IP, preferably at a faster than real-time video rate. The IP subsequently transmits the movie at a less than real time rate to the user via the narrowband side of the switch and the telephone network. The user's terminal would store the movie for real time replay.

Another exemplary service is video mail. In this service a party at a first terminal shoots a home movie on a video camcorder. The first terminal digitizes the video and transmits the digitized information at a slower than real time rate through the telephone network to the IP. The IP performs any necessary protocol conversions, e.g. into MPEG format. Based on selection inputs from the party at the first terminal, the IP goes out through a broadband network (e.g. an asynchronous tranfer mode (ATM) network) to an information provider. The IP asks for special processing of the video by the processor. In one example, the IP obtains a leader and a trailer from the provider for addition to the video. The IP subsequently transmits the processed video to the intended recipient, for example, as another low-speed transmission through the telephone network. If the intended recipient connects to a broadband network, the IP can transfer the composite message to a server connected to that network. If the IP connects directly to that network serving the recipient, the IP can transmit the message through that network to the recipient's terminal.

Figure 9:
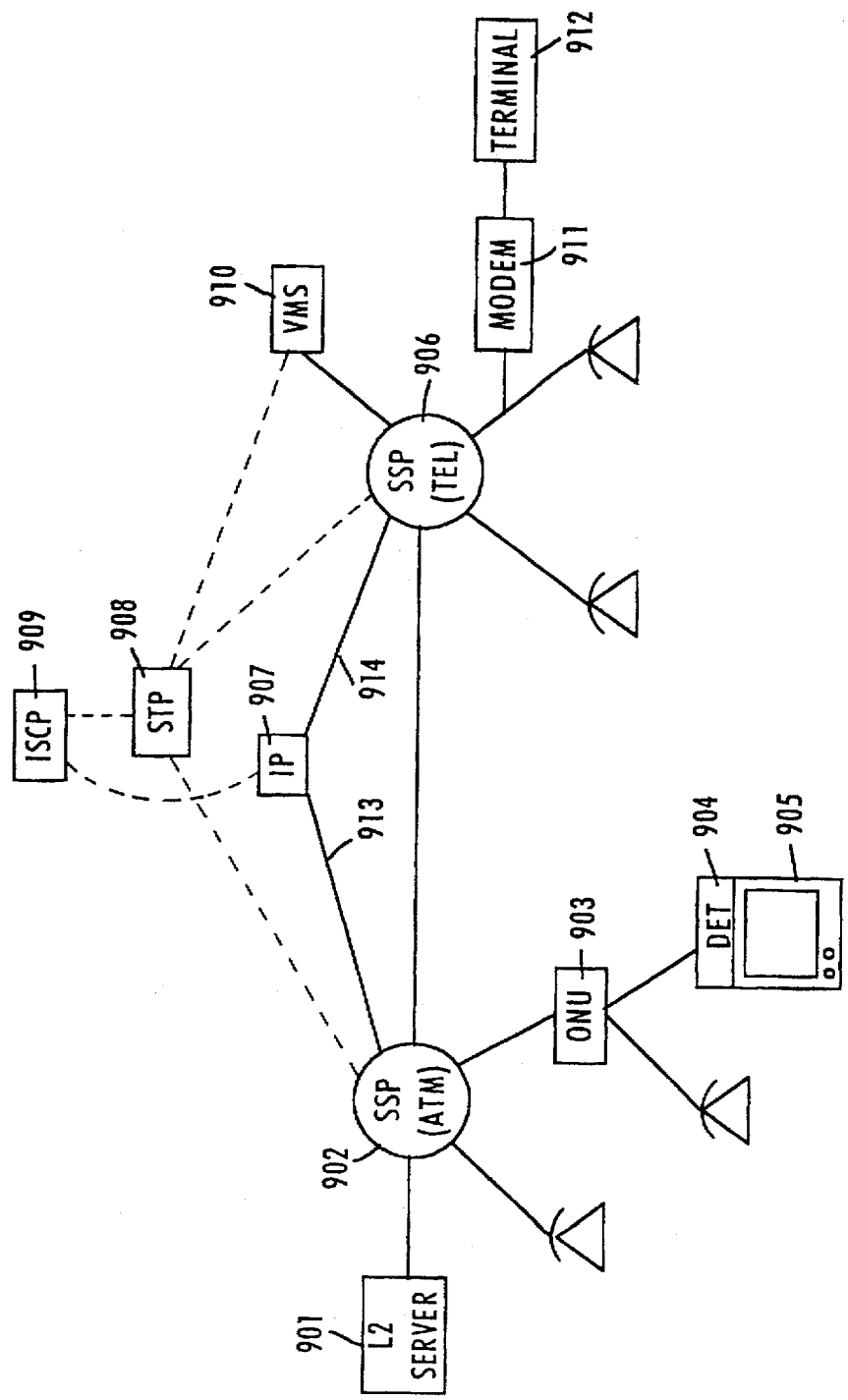
FIG. 9 is a schematic block diagram of an Advanced Intelligent Network architecture showing an exemplary implementation of a split switch intelligent peripheral platform in a narrowband and broadband network.

FIG. 9 shows a schematic block diagram of an Advanced Intelligent Network architecture showing an exemplary implementation of a split switch intelligent peripheral platform used in a narrowband and broadband network which can make such a call. Although shown simply as a box in FIG. 9, the IP is the preferred embodiment of the invention shown in FIGS. 7 and 8.

Figure 3:
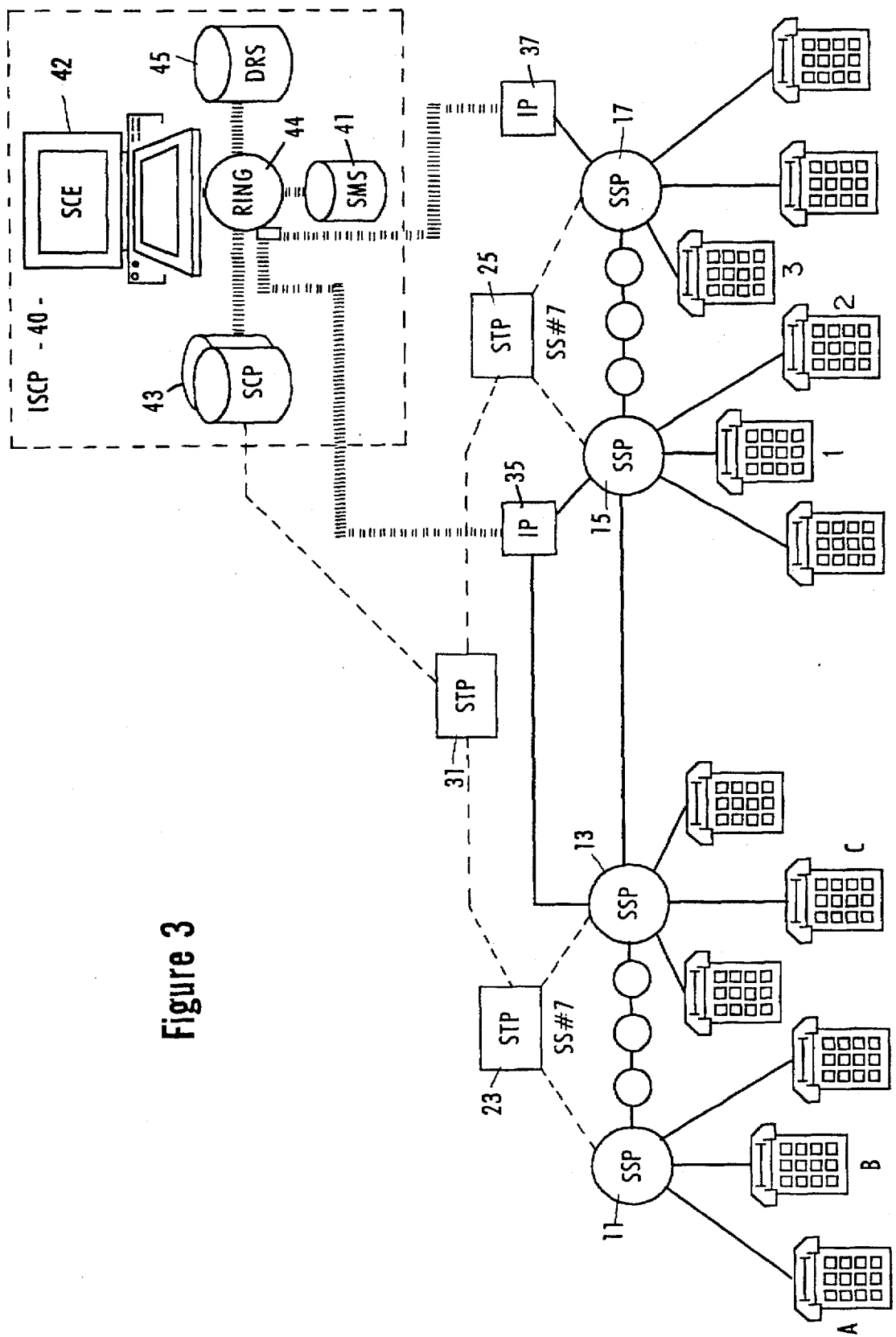
FIG. 3 is a schematic block diagram of an Advanced Intelligent Network architecture showing an exemplary implementation of two intelligent peripheral platforms in a entirely narrowband network.

Unlike the network shown in FIG. 3, SSP 902 is a swiching point for a broadband ATM network. It can receive video from level 2 gateway video server 901 and send it through ONU 903 and digital entertainment terminal 904 to be viewed on television 905. SSP 902 may also send the video to intelligent peripheral 907 over a broadband connection. The video will be received by the gateway switch of IP 907 and converted into a format suitable for transmission over a telephone line connection to a user having modem 911 and terminal 912. Terminal 912 may be a television with a digital entertainment terminal or a personal computer able to receive the reformatted video data and display it on a monitor.

Various aspects of the call connection may be predetermined and implemented using AIN functions, such as speed dialing, controlled by the service logic resident in ISCP 909. Control signals are sent over the SS7 signaling network to SSP 902, STP 908 and SSP 906 to set up the call.

The video data may be transmitted from L2 server to IP 907 through SSP 902 and a broadband connection 913 such as a trunk or T1 line. IP 907 receives the video data at a broadband port of the gateway switch and the signalling information indicating that it is to be forwarded to terminal 912 over narrowband telephone line connection 914. The CPU of the gateway switch controls the broadband and narrowband switch fabric so that the video data is appropriately routed after processing is completed. The protocol converter of IP 907 converts the format of the video data to a format acceptable for an internal video processing module.

The internal video processing module may, for example, process the video data into a video greeting card personalized with the person's name or some other personal data stored in ISCP 909, etc. The personalized greeting card will then undergo conversion into a format, such as MPEG, which enables it to be transmitted over phone line 914 using ADSL, TCP/IP or other narrowband technology. The gateway switch will then output the personalized greeting card from a narrowband port to the receiving user's terminal 912.

Such a service would not be possible with intelligent peripherals restricted to use with narrowband networks. Such a service is also facilitated by the use of AIN functions even though the service is in part a broadband service. Although not spectficially discussed herein, a large number of services using the split switch IP would be evident to one of ordinary skill in the art.

Although several preferred embodiments of the invention have been described in detail above, it should be clear that the present invention is capable of numerous modifications as would be apparent to one of ordinary skill in the art. Such modifications fall within the purview of the appended claims.

We claim:

1. A communication network, comprising:
   local communication lines;
   a plurality of separately located central office switching systems interconnected via trunk circuits for selectively providing switched call connections between at least two of the local communication lines;
   a broadband communication network;
   a service control point, separate from the central office switching systems, comprising a database storing call processing data associated with a plurality of the local communication lines for control of call processing through one or more of the central office switching systems; and
   an intelligent peripheral, said intelligent peripheral comprising a switch coupled to at least one of the central office switching systems and to the broadband communications network, said switch selectively providing broadband and narrowband connections, at least one processing module for providing an enhanced service feature on the basis of received broadband data and at least one processing module for providing an enhanced service feature on the basis of received narrowband data.

2. A network as in claim 1, wherein said services control point further comprises a service management system, a data and reporting system for capturing and storing a data record of calls processed by accessing the database, a service creation environment terminal subsystem for programming the database, and an internal data communication system interconnecting said database, said service management system, said data and reporting system and said service creation environment.

3. A network as in claim 1, wherein said intelligent peripheral sends and receives control signals over a signalling communication system.

4. A network as in claim 3, wherein said intelligent peripheral sends and receives voice mail messages over a signalling communication system.

5. A network as in claim 1, wherein said local communication lines comprise telephone lines, and said central office switching systems comprise telephone switches.

6. A network as in claim 1, wherein said at least one processing module for providing an enhanced service feature on the basis of received narrowband data comprises a module for transmitting voice messages and receiving dialed digit signals.

7. A network as in claim 1, wherein said at least one processing module for providing an enhanced service feature on the basis of received narrowband data comprises a module for processing voice messages and dual-tone multifrequency signals and at least one server for providing an auxiliary call processing capability.

8. A network as in claim 3, wherein said signalling communication system is a common channel interoffice signalling network.

9. A network as in claim 3, wherein said signalling communication system is an F-link.

10. A network as in claim 3, wherein said signalling communication system is a TCP/IP network.

11. A network as in claim 3, wherein said signalling communication system is a local area network.

12. A network as in claim 11, wherein the local area network is an Ethernet.

13. A network as in claim 3, wherein said local communication lines comprise telephone lines, and said central office switching systems comprise telephone switches interconnected to each other by voice telephone type trunk circuits separate from said common channel interoffice signaling system.

14. A network as in claim 1, wherein said switch comprises a gateway switch having a narrowband trunk network, a broadband trunk network, a narrowband line network, and a CPU for controlling the switching of said narrowband trunk network, said broadband trunk network, and said narrowband line network.

15. A network as in claim 1, wherein said switch comprises a plurality of trunk and line interfaces and an internal data communication system carrying information between said plurality of modules and said line and trunk interfaces.

16. A network as in claim 15, wherein said intelligent peripheral further comprises a message storage means, accessible by at least one of said plurality of modules, for storing and retrieving messages therefrom each of which has been received through or will be transmitted through one of said line and trunk interfaces.

17. A split switch intelligent peripheral for narrowband and broadband services comprising:
   a switch selectively providing separate broadband and narrowband data connections to a communications network;
   at least one processing module, coupled to said switch, for providing an enhanced service feature on the basis of received broadband data; and
   at least one processing module, coupled to said switch, for providing an enhanced service feature on the basis of received narrowband data.

18. A split switch intelligent peripheral as in claim 17, wherein said split switch intelligent peripheral further comprises a signalling communication module for two-way communications of signalling data messages between the intelligent peripheral and nodes of the communication network.

19. A split switch intelligent peripheral as in claim 17, wherein said intelligent peripheral further comprises a message storage module for storing and retrieving messages therefrom each of which has been received through or will be transmitted through said switch and an internal data communication system connected to a signalling network to permit communications with a services control point and transfer of stored messages from the message storage means in said intelligent peripheral.

20. A split switch intelligent peripheral as in claim 19, wherein said message storage module comprises a digital voice message storage and retrieval system.

21. A split switch intelligent peripheral as in claim 19, wherein said message storage module comprises a facsimile message storage and retrieval system.

22. A split switch intelligent peripheral as in claim 19, wherein said message storage module comprises a broadband message storage and retrieval system.

23. A split switch intelligent peripheral as in claim 17, wherein said intelligent peripheral comprises a module for processing voice messages and dual-tone multifrequency signals, at least one server for providing an auxiliary call processing capability, an interface to a signalling communication system, and an internal communication network carrying information between said processing module, said server and said interface.

24. A communications method comprising the steps of:
connecting a plurality of separately located central office switching systems via trunk circuits;
selectively providing switched call connections between at least two of a plurality of local communication lines connected to said plurality of separately located central office switching systems;
storing call processing data, associated with a plurality of the local communication lines for control of call processing through one or more of the central office switching systems, in a service control point, separate from the central office switching systems;
providing broadband communications over a broadband communications network; and
providing enhanced service features using an intelligent peripheral, said intelligent peripheral comprising a switch coupled to at least one of the central office switching systems and to the broadband communications network, said switch selectively providing broadband and narrowband connections, at least one processing module for providing an enhanced service feature on the basis of received broadband data and at least one processing module for providing an enhanced service feature on the basis of received narrowband data.

25. A method as in claim 24, wherein said step of providing enhanced service features using said intelligent peripheral comprises sending and receiving control signals over a signalling communication system.

26. A method as in claim 24, wherein said step of providing enhanced service features using said intelligent peripheral comprises sending and receiving voice mail messages over a signalling communication system.

27. A method as in claim 24, wherein said local communication lines comprise telephone lines, and said central office switching systems comprise telephone switches.

28. A method as in claim 24, wherein said step of providing enhanced service features using said intelligent peripheral comprises transmitting voice messages and receiving dialed digit signals.

29. A method as in claim 24, wherein said step of providing enhanced service features using said intelligent peripheral comprises processing voice messages and dual-tone multifrequency signals and performing auxiliary call processing functions.

30. A method as in claim 26, wherein said signalling communication system is a common channel interoffice signalling network.

31. A method as in claim 24, further comprising the step of connecting said central office switching systems to each other by voice telephone type trunk circuits separate from a common channel interoffice signaling system.

32. A method as in claim 24, further comprising the steps of controlling the switching of a narrowband trunk network, a broadband trunk network, and a narrowband line network in the switch of the intelligent peripheral using a CPU.

33. A method as in claim 24, further comprising the step of carrying information on an internal data communication system between said plurality of modules and a plurality of trunk and line interfaces in said switch of the intelligent peripheral.

34. A method as in claim 24, comprising the further steps of storing and retrieving messages from a messages storage means, accessible by one of said at least one processing module, each of said messages having been received through or will be transmitted through one of said line and trunk interfaces of said intelligent peripheral.

35. A method as in claim 34, wherein said messages are stored and retrieved via a signaling network separate from traffic links.

36. A method as recited in claim 24, comprising the further step of converting the format of information received through the switch of the intelligent peripheral into another format.

37. A method as recited in claim 36, wherein said information received through the gateway received comprises broadband information and said step of converting comprises converting the format of said broadband information into a narrowband communication format.

38. A method as recited in claim 37, wherein the format of said broadband information is an asynchronous transfer mode (ATM) format.

* * * * *